United States Patent [19]
Gay

[11] Patent Number: 5,524,215
[45] Date of Patent: Jun. 4, 1996

[54] BUS PROTOCOL AND METHOD FOR CONTROLLING A DATA PROCESSOR

[75] Inventor: James G. Gay, Pflugerville, Tex.

[73] Assignee: Motorola, Inc., Schaumburg, Ill.

[21] Appl. No.: 133,413

[22] Filed: Oct. 5, 1993

[51] Int. Cl.⁶ ................................... G06F 13/42
[52] U.S. Cl. ............... 395/287; 395/293; 364/242.6; 364/242.92; 364/240; 364/240.5; 364/DIG. 1
[58] Field of Search ................... 395/325, 725, 395/275, 425, 287, 288, 293, 200.01, 800; 370/85.2, 85.6; 340/825.5, 825.52

[56] References Cited

U.S. PATENT DOCUMENTS

| | | | |
|---|---|---|---|
| 4,257,095 | 3/1981 | Nadir | 395/325 |
| 4,602,327 | 7/1986 | LaViolette et al. | 395/325 |
| 4,789,926 | 12/1988 | Clarke | 395/325 |
| 5,088,028 | 2/1992 | Theus et al. | 395/325 |
| 5,127,089 | 6/1992 | Gay | 395/325 |
| 5,195,185 | 3/1993 | Marenin | 395/325 |
| 5,301,282 | 4/1994 | Amini et al. | 395/325 |
| 5,325,535 | 6/1994 | Santeler et al. | 395/725 |
| 5,398,244 | 3/1995 | Mathews et al. | 370/85.6 |
| 5,416,910 | 5/1995 | Moyer et al. | 395/325 |
| 5,418,914 | 5/1995 | Heil et al. | 395/325 |

*Primary Examiner*—Gopal C. Ray
*Attorney, Agent, or Firm*—Keith E. Witek

[57] ABSTRACT

A bus protocol uses signals to designate a bus transfer termination (BTT*) and a bus grant relinquish (BGR*). The BTT* signal is an output which is asserted by a bus master which currently has ownership of a bus to indicate to other potential bus masters that a bus transfer is complete and that bus ownership may be transferred to another bus master. The BGR* signal is an input to a bus master. When BGR* is asserted, a bus arbiter/controller is informing the current bus master that the bus must be relinquished as soon as possible, after the deassertion of the Bus Grant signal, with no regard for locked sequences. If BGR* is deasserted, the bus arbiter is informing the current bus master that the bus can be relinquished at a time which is convenient for the current bus master. In general, BGR* is a bit which indicates the urgency of a pending bus ownership transfer.

25 Claims, 6 Drawing Sheets

BUS PROTOCOL AND METHOD FOR CONTROLLING A DATA PROCESSOR

FIELD OF THE INVENTION

The present invention relates generally to data processors, and more particularly, to bus protocols which allow data processors to communicate with other circuits.

BACKGROUND OF THE INVENTION

The performance of a bus protocol directly impacts the overall performance of an integrated circuit and/or an integrated circuit system. Known bus protocols have a problem wherein an external bus arbiter is not always able to determine a point at which bus ownership may be transferred to another master when the current master is performing a series of back-to-back locked transfer sequences in a synchronous bus system. The occurrence of a locked transfer will typically be denoted in known systems with a LOCK signal which indicates that the current master intends the transfer or sequence of transfers to be atomic (i.e. not capable of being separated). However, if the master has several series of these atomic locked sequences back-to-back, and if an external arbiter could be aware of the abutments of these atomic sequences, it would be perfectly permissible for the external arbiter to take the bus ownership away from the master and give it to a more needy master at the interface between the sequences.

Known bus protocols could not prevent the starvation of the other bus masters during times when a bus master is performing a long series of back-to-back locked transfers. FIG. 4 shows the operation of the synchronous bus performing two consecutive locked sequences with no intervening bus clocks. From FIG. 4 it can be seen that an external arbiter cannot determine the difference between a single, many-transfer locked sequence and multiple sequences that have no intervening bus clocks. This is a problem when the arbiter needs to let another bus master have the bus, but needs to preserve the locked nature of the linked locked sequences without interruption. To guarantee no disruption of the locked sequences the arbiter is forced to wait for the negation of LOCK before negating BG (bus grant) to the master currently using the bus. Since LOCK is not negated between sequences, the current master can effectively monopolize the bus by running back-to-back locked sequences.

Note that known bus protocols require that LOCK be asserted through the termination of the last transfer in a locked sequence. LOCK must remain asserted for all transfers within a locked sequence since a slave may signal the need for a transfer retry on any transfer.

One known bus protocol tried to fix the above-described problem by the addition of one or two dead clocks between locked sequences. These dead clocks were found to either end up breaking a locked sequence or had the undesirable side-effect of lowering performance and increasing bus latency for other masters with urgent requests. To further solve the above-stated problem, bus protocols incorporated a last locked bus cycle status indicator (LOCKE) to allow the arbiter to negate BG to the master during the last transfer of a locked sequence and overlap arbitration with the transfer. However, there is a case during a bus cycle retry where the external bus arbiter must asynchronously reassert BG to preserve the locked integrity of the bus transactions. FIG. 5 shows this case. Note in FIG. 5 the bus arbiter negates BG in bus cycle 2 (BC2) when it sees LOCKE asserted and BR (bus request) negated. However, a transfer retry is signaled (TRA asserted) and to prevent the breaking of a locked sequence the external bus arbiter must asynchronously reasserted BG. This makes the design of an external bus arbiter which solves the above-stated problem very difficult since the retry signal (TRA) must also now be sampled at a very fast rate. This is most likely impossible at very high processor clock frequencies and impossible for totally synchronous designs.

Known overlapped bus arbitration protocols also have a problem of denoting the end of bus tenure by a current bus master while a second master is starting to use the bus without resorting to asynchronous, self-timed, or tick based logic internal to a bus master. A known protocol for handling this problem is the Bus Busy protocol. Problems occur at very high bus frequencies using the Bus Busy (BB) protocol. FIG. 1 shows the operation of the Bus Busy protocol in a known system. Normally in a system, the primary master Bus Busy ($PM_{13}$ BB*) and alternate bus master Bus Busy ($AM_{13}$ BB*) signals will be tied together and pulled-up with a resistor to Vdd, but these signals have been broken out here to show the potential for Bus Busy signal contention at bus mastership transfer times. The system of FIG. 1 uses a tick based internal clock and attempts to solve the above-stated problem by separating the turn-on and turn-off times by a dead tick. A tick is a fraction of a full clock period. The dead tick method may work at slow bus frequencies but will not work at high bus frequencies because of the narrower tick times and RC constant of the bused Bus Busy signal.

SUMMARY OF THE INVENTION

The previously mentioned disadvantages are overcome and other advantages achieved with the present invention. In one form, the present invention comprises a bus protocol method for controlling a bus transfer. The method begins by granting bus ownership to a master circuit by asserting a first control signal. Data is transferred between the master circuit and a device external to the master circuit in response to the assertion of a second control signal. A third control signal is sent to the master circuit. The third control signal indicates to the master circuit whether the master circuit bus ownership should be relinquished at the termination of a current bus cycle or should be terminated at the discretion of the master circuit when the first control signal is deasserted to indicate to the master circuit that the bus ownership should be relinquished. A fourth control signal is asserted to indicate external to the master circuit that the master circuit has terminated its bus ownership. The fourth control signal is asserted at a time which is determined by the state of the third control signal and the first control signal.

In another form, the invention comprises a bus protocol for allowing a first circuit to interface to a second circuit through a bus. Circuitry provides a first control signal as an output from the first circuit to indicate that ownership of the bus is requested. Circuitry for receiving accepts a second control signal as an input to the first circuit which is used to indicate whether the first circuit is granted ownership of the bus. Circuitry for providing generates a third control signal as an output from the first circuit wherein the third control signal is asserted only when the first circuit is ready to relinquish ownership of the bus.

In yet another form the invention comprises a bus protocol for allowing a first circuit to interface to a second circuit through a bus using circuitry for receiving a control signal wherein the control signal is an input to the first circuit. The control signal is set to a first logic state to indicate that the first circuit must relinquish bus ownership at the end of a current bus cycle being performed by the first circuit. The control signal is set to a second logic state to indicate that the first circuit is to relinquish bus ownership at a convenient time determined by the first circuit.

The present invention will be more clearly understood from the detailed description below in conjunction with the accompanying drawings.

Figure 1:
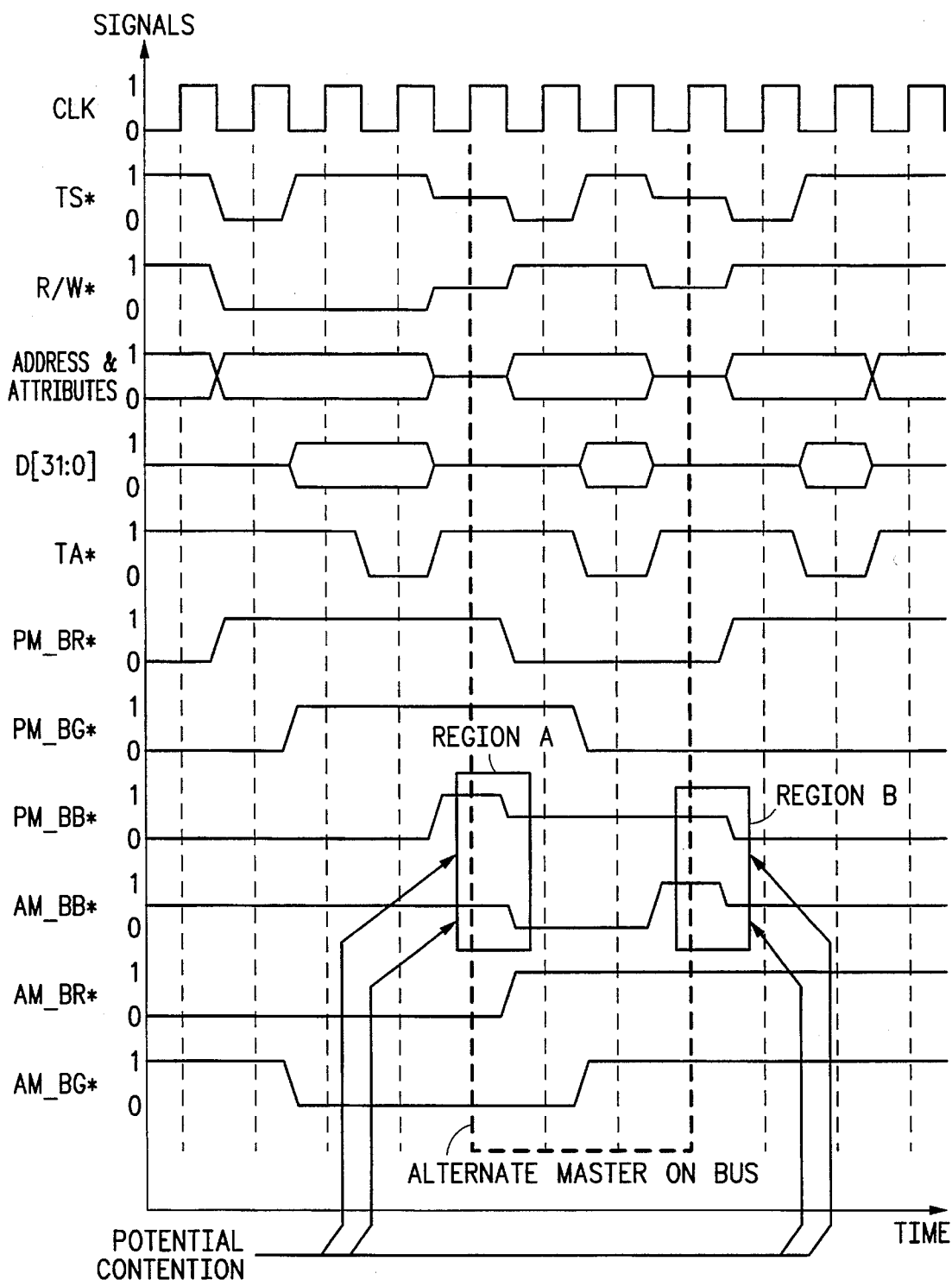
FIG. 1 illustrates, in a timing diagram, a conventional bus protocol used to indicate the end of a bus tenure.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

The bus protocol and method of operating a bus taught herein solves a problem in overlapped bus arbitration systems of denoting the end of bus tenure by a current bus master while a second master is starting to use the bus without resorting to asynchronous, self-timed, or tick based logic internal to a bus master. FIG. 1 illustrates a timing diagram of a known bus protocol and method. FIG. 1 illustrates signals which are abbreviated as follows: CLK= clock; TS*=transfer start; R/W*= read/write; Address & Attributes=Address bits and bus attribute bits; D[31:0]=data bits; TA*=transfer acknowledge; PM_BR*=primary master bus request; PM_BG* =primary master bus grant; PM_BB*=primary master bus busy; AM_BB*=alternate master bus busy; AM_BR*=alternate master bus request; and AM_BG* =alternate master bus grant. It should be noted that the '*' symbol in signal names indicates that the signal is an active low signal.

FIG. 1 illustrates that a problem occurs in the prior art protocol at very high bus frequencies using the Bus Busy (BB*) signals in FIG. 1. Normally in a system, the primary bus master Bus Busy (PM_BB*) and alternate bus master Bus Busy (AM_BB*) signals will be tied together and pulled-up with a resistor to Vdd, but these signals have been separately illustrated in FIG. 1 to show the potential for Bus Busy (BB*) signal contention at bus ownership transfer times. The primary master uses a tick-based internal clock and attempts to solve the BB* contention problem by separating the turn-on and turn-off times of the bus busy signal (BB*) by a dead tick. This may work at slow bus frequencies but will not work at high bus frequencies because of the narrower tick times and RC constant of the transmitted Bus Busy (BB*) signal. In FIG. 1, a region A and a region B illustrate regions in time wherein, at higher frequencies, one BB* signal (either PM_BB* or AM_BB*) could be driving a logic one while the other BB* signal is driving a logic zero. This bus contention is not advantageous.

Figure 2:
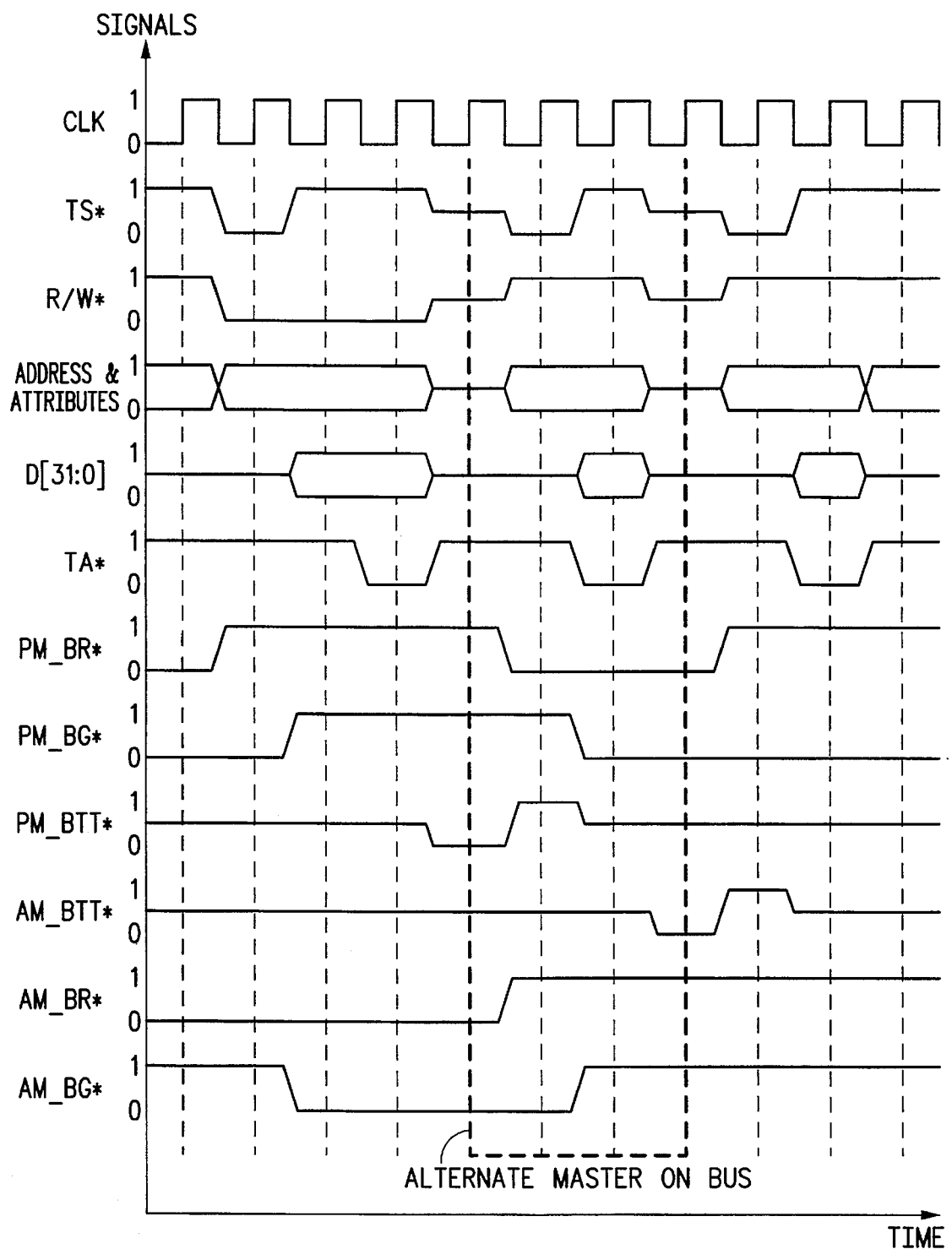
FIG. 2 illustrates, in a timing diagram, a bus protocol used to indicate the end of a bus tenure in accordance with the present invention.

FIG. 2 illustrates the operation of a Bus Tenure Terminated (BTT*) protocol in accordance with the present invention. Normally, the primary bus master Bus Tenure Terminated (PM_BTT*) and alternate bus master Bus Tenure Terminated (AM_BTT*) signals will be tied together and pulled-up with a resistor to Vdd (a supply voltage), but these signals have been separated in FIG. 1 to illustrate that no potential for Bus Tenure Terminated signal contention occurs at bus ownership transfer times. Further, the timing of the Bus Tenure Terminated (BTT*) signals can be totally synchronous with the system clock obviating the need for asynchronous, self-timed or tick based logic internal to a bus master.

When referring to FIG. 2, the terms "bus cycle" and "transfer cycle" refer to one complete bus operation cycle from the clock edge when the transfer start (TS*) is asserted until the clock edge when the last termination acknowledge signal (TA*, TEA* or TRA*) of the final transfer is sampled. None to several transfers of data may occur within one bus cycle. The term "transfer" by itself refers to a singular clock period when data is either transferred to or from the processor.

In FIG. 2, CLK indicates a system clock. The TS* signal is the transfer start signal. The transfer start (TS*) signal is asserted by the primary master during the clock cycle in which the address lines become stable, and is negated in the following clock cycle. The TS* signal indicates the start of a bus cycle for the primary master when the primary master has ownership of the bus. The TS* signal, while possibly serving other functions, is examined by the primary master when the primary master is not the bus master to maintain internal state information about the bus mastership rights within the system. All masters which can perform bus cycles on the bus must have their TS* signals bused together. When the primary master is not the bus master, TS* is normally tristated by the primary master.

In FIG. 2, the R/W* signal is driven by the primary master when the primary master has ownership of the bus. The R/W* signal indicates the direction of subsequent data transfers (either a read from external to the master or a write external to the master). The R/W* signal is asserted high during read bus cycles and asserted low during write bus cycles. When the 68060 is not the bus master, this signal is tristated.

In FIG. 2, the signal TA* (or an equivalent signal such as a transfer error acknowledge [TEA*] or a transfer retry acknowledge [TRA*]) is used to indicate the end of a bus cycle. Specifically, when the primary master is the bus master (i.e. has ownership of the bus), the TA* signal is asserted by a current slave, which is coupled to the bus, at a clock wherein data to be transferred in the bus cycle is valid and ready to be sampled during a bus read operation. Alternatively, the TA* signal is asserted by a current slave at the clock where data transferred from the primary master is accepted by the slave during a bus write operation. In order for the primary master to accept the transfer as successful with a transfer acknowledge (TA*), TRA* and TEA* must both be negated when TA* is asserted. In other words, retry and error bus transfer signals have precedence over the TA* signal.

In FIG. 2, the D[31:0] signals are bi-directional signals that carry data for the current transaction. During a burst bus cycle, the data lines are time multiplexed to transfer all parts of the overall burst request. In FIG. 2, the address signals are output by the primary master when the primary master has ownership of the bus. The address bits are used to indicate the address of the first item of a bus transfer.

In FIG. 2, bus cycle attribute signals are used to indicate what type of transfer is occurring on the bus. For example, these signals may indicate a 16-bit move or a 32-bit move. User or supervisor mode accesses can be specified. Caches can be properly controlled. Memory management units may be accessed. Data transfer size may be determined. Byte selection within a transferred longword can occur. Bus locking can be determined. In general, many transfer attribute functions and signals exist in the art and any/all may be used in FIG. 2.

The PM_BR* signal in FIG. 2 is the bus request signal for the primary master or primary processor. The PM_BR* signal is sent from the primary master to an external bus arbiter and can be asserted or negated at any time. PM_BR* is asserted by the primary master to indicate a need to use the bus, and is held asserted until the primary master no longer needs the bus. This assertion time includes time when the primary master is the bus master (i.e. has ownership of the bus) as well as when the primary master is not the bus master (i.e. does not have ownership of the bus.

Note also, the need by the primary master to use the bus may evaporate due to changes in internal state before the bus arbiter can grant the bus to the primary master processor via the PM_BG* signal. This would be the case if PM_BR* was ever asserted for some period of time and then negated before PM_BG* could be asserted by the external bus arbiter. Thus, the external bus arbiter must handle the case where the primary master requests usage of the bus but never actually takes over bus mastership when the bus arbiter asserts PM_BG* to the primary master. This case can be detected by noting that the primary master has negated PM_BR* and does not assert TS* on the next clock edge after PM_BG* has been asserted by the external bus arbiter. It should be noted that this is not the case if PM_BG* has been asserted to the primary master and primary master still has PM_BR* asserted but has not yet asserted TS*. A delay in the assertion of TS*, with PM_BR* remaining asserted, by the primary master after it has received PM_BG* is due to a special internal condition caused by a operand bus operation which preempts an instruction bus request operation. In this case, the primary master still intends to use the bus as long as PM_BR* remains asserted.

FIG. 2 illustrates a PM_BG* signal. The PM_BG* signal is the bus grant signal given by an external arbiter to the primary master indicating the primary master can control the bus as soon as the current master finishes the current bus cycle and relinquishes the bus with a control signal. Control signals for relinquishing the bus are discussed below. When PM_BG* is negated by the arbiter, the primary master relinquishes the bus via a control signal as soon as the current bus cycle is complete, unless a locked sequence of bus cycles is in progress with a BGR* (Bus Grant Relinquish) negated (BGR* signals are discussed further below and in a subsequent figure). When a locked sequence of bus cycles is in progress with BGR* negated the primary master will complete the sequence of atomic locked bus cycles and then give indication it has relinquished the bus by asserting PM_BTT* (the transfer termination control signal) and negating PM_BB* (a bus busy signal not illustrated in FIG. 2 but illustrated in FIG. 1 ). In general, only the PM_BTT* signal is required to determine the end of the bus cycle, and PM_BB* is provided for processor family compatibility.

The BGR* signal is not illustrated in FIG. 2 because the signal BTT* is emphasized. The BGR* signal is briefly explained here and explained in detail later. The brief description of BGR* is provided here in order to better understand the operations of the BG* signals in FIG. 2. The BGR* (Bus Grant Relinquish Control) signal is a qualifier for PM_BG* which indicates to the primary master processor the degree of necessity for relinquishing bus ownership when PM_BG* is negated. The BGR* signal affects how the primary master will behave during atomic locked bus sequences when BG* is negated. The assertion of BGR* indicates to the primary master that bus ownership by the primary master should be relinquished on the last transfer of the current bus cycle when BG* is negated even if the primary master had intended a series of bus cycles be locked together. BGR* negated when BG* is negated indicates to the primary master that the primary master bus ownership should be relinquished under locked bus conditions (a LOCK* control signal asserted [not illustrated]) only after the entire series of locked bus cycles has finished to guarantee no disruption of the atomic sequence occurs.

In other words, when BGR* is asserted, the primary master should, once PM_BG* is negated, get off the bus as soon as possible regardless of locked sequences, etc. The BGR* signal being negated indicates less of a bus termination urgency, and the primary master can continue transferring on the bus until an appropriate termination time eventually occurs.

The PM_BTT* signal is illustrated in FIG. 2. The PM_BTT* signal is asserted for a one clock period to indicate to other masters in a system that the primary master has relinquished its bus tenure after an external arbiter has negated PM_BG* to the processor. The PM_BTT* signal is driven negated for one clock period immediately after its assertion. At all other times PM_BTT* is tristated. It is important to note that FIG. 2 illustrates how the primary master and the alternate master drive output pins. Some of the output pins in FIG. 2 may be coupled together to form one unified signal. For example, PM_BTT* is usually coupled to AM_BTT* and any other BTT* pins in the system. The primary master only samples the PM_BTT* as an input when it is not the bus master to maintain internal state and keep track of when it may take over bus mastership. The bus master drives PM_BTT* to indicate to all other alternate masters in the system that the primary master is terminating bus ownership. Therefore, the BTT* signal to a processor is sometimes an input to signal that another master is giving up ownership of the bus, or BTT* may be used by a processor as an output to indicate that its ownership of the bus is being terminated.

To properly maintain this internal state information, all masters on the bus must have their TS* signals bused together so the primary master and any other bus masters can keep track of coupled TS*-BTT* pairs. For example, if a BTT* signal occurs with no TS* signal being asserted thereafter, then the bus is free from current ownership. If a BTT* signal occurs with a TS* signal being asserted thereafter, then the bus is in use (i.e. owned) by another master. Therefore monitoring of both of the signals TS* and BTT* is important to determine bus status.

In the protocol of FIG. 2, the primary master will provide a BB* signal (not illustrated in FIG. 2) in order to provide a compatible signal for the processor of FIG. 1. However, in a preferred form, either the BTT* signal and protocol of FIG. 2 should be used or the BB* signal and protocol of FIG. 1 should be used, not both. The BTT* signal provides more flexibility with reduced bus contention and is therefore preferred. The unused signal, preferably BB*, should be continuously pulled-up through a resistor to a negated state. As discussed herein, the BTT* protocol will achieve higher performance at full bus speed and high frequencies of operation than the BB* protocol.

In FIG. 2, the AM_BTT* signal, the AM_BR* signal, and the AM_BG* signal function in an identical manner to PM_BTT*, PM_BR*, and PM_BG*, respectively. The only difference is that the one group of signals functions for the primary master whereas the other group of signals function for the alternate master.

In FIG. 2, the BTT* (Bus Tenure Terminated) protocol concept is unlike the BB* protocol of FIG. 1. The BTT* protocol does not constantly give indication of bus use, but simply flags the times at which a master is done using the bus. The BTT* signal is all another master needs to detect when it is safe to take over the bus. Thus, BTT* is tristated at all times when a master is using the bus and asserted for one clock period, negated for one clock period, and then tristated again until another bus termination point in time. A master waiting to use the bus simply has to detect the one clock assertion of BTT* to know that the previous master is finished using the bus. Note that BTT* can be synchronously driven high for one full clock, unlike the BB* signal of FIG. 1, to prevent the long RC delays that would occur if the signal was just tristated. Notice also in FIG. 2 that there is always at least one clock between the time when one master has been driving BTT* negated and then tristated BTT* to another master starting to assert BTT* thus preventing contention unlike BB* of FIG. 1.

In general, the BTT* protocol concept allows true overlapped bus arbitration to occur for a synchronous bus structure without resorting to asynchronous, self-timed, or tick based logic internal to a bus master. The BTT* protocol solves the problem of contention that the BB* protocol has at very high bus frequencies.

Figure 3:
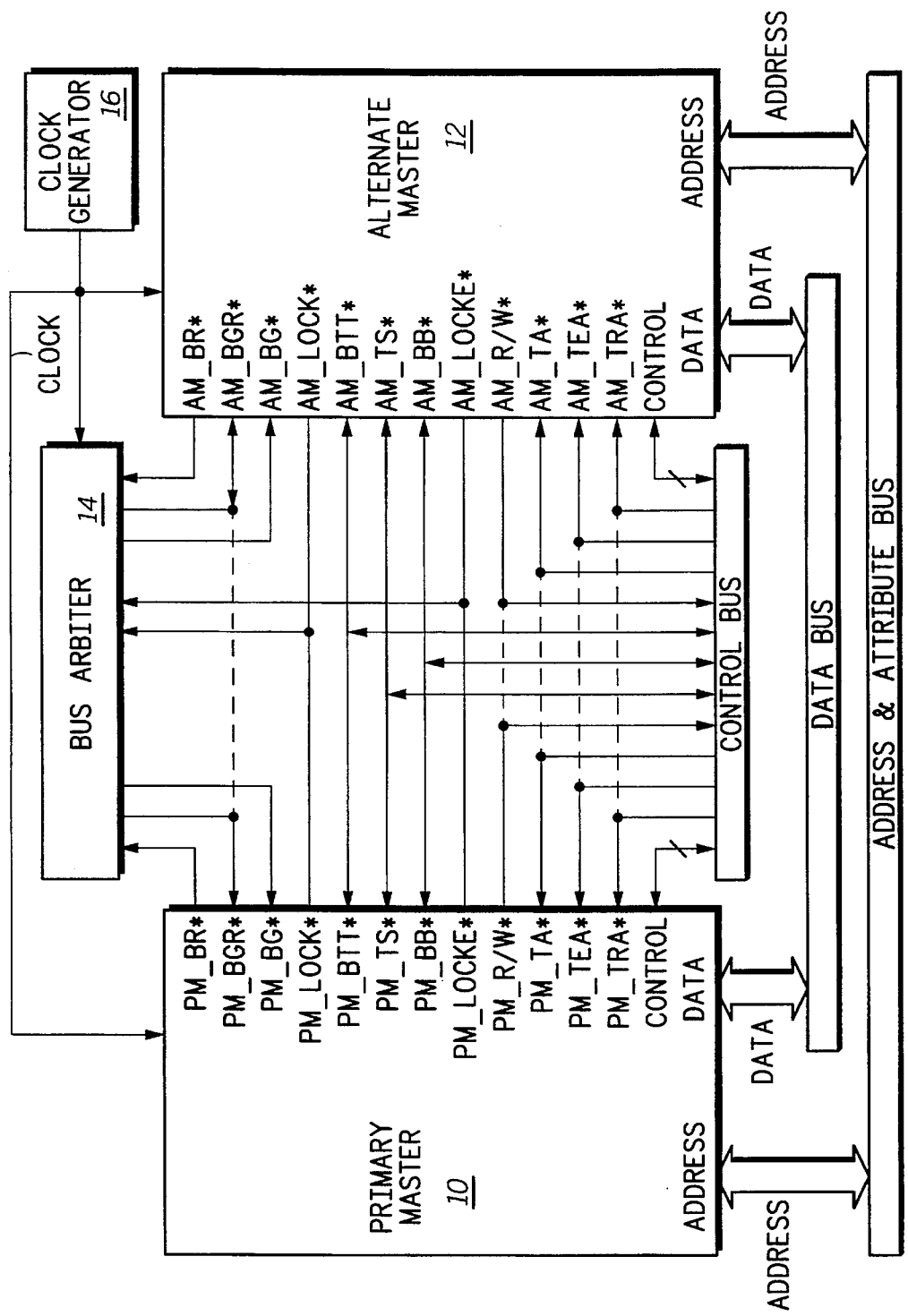
FIG. 3 illustrates, in a block diagram, a system used to implement the bus protocol of FIG. 2.

FIG. 3 illustrates a system which may be used to implement the BTT* protocol of FIG. 2. FIG. 3 illustrates several solid lines as interconnections. The dashed line interconnects in FIG. 3 indicate a variation of the interconnections scheme or additions to the interconnection scheme of the elements of FIG. 3. FIG. 3 has a primary master 10, a alternate master 12, and a bus arbiter 14, all interconnected in some manner. FIG. 3 illustrates a control bus, a data bus, and an address bus. The control bus may interconnect any two or more control signals, route any two or more control signals and the like. The signals BR*, BGR*, BG*, LOCK*, LOCKE*, could optionally be connected to the control bus although these signals are not illustrated in FIG. 3 as being connected to the control bus. In FIG. 3, the buses are arbitrated by the central bus arbiter 14 using individual request/grant lines for each bus master. The arbitration protocol (i.e., determining which processor should have ownership of the bus) can operate concurrently with bus transfer activity so the bus ownership transfer can be made without much performance penalty.

FIG. 3 illustrates one example of a block diagram depicting how the bus arbitration signals could be routed in a multi-master system with a bus arbiter/controller. FIG. 3 illustrates a primary master bus request (PM_BR*) input and an alternate master bus request (AM_BR*) input. The BR* signals are connected to the bus arbiter 14. A PM_BGR* (bus grant relinquish) and an AM_BGR* (bus grant relinquish) are illustrated as being connected to the arbiter 14. A PM_BG* (bus grant) and an AM_BG* (bus grant) are illustrated as being connected to the arbiter 14. LOCK* and LOCKE* signals are output by the masters 10 and 12 and are connected to the arbiter 14. Control signals BTT* (bus transfer termination), TS* (transfer start), and BB* (bus busy) are connected between master 10 and 12 and connected to the control bus. Data lines are connected from each master 10 and 12 to the data bus and address lines are connected from each master 10 and 12 to the address bus. All other control signals, such as R/W* (read/write), TA* (transfer (acknowledge), TEA* (transfer error acknowledge), TRA*(transfer retry acknowledge), and any other bus control signals, are connected to the control bus as illustrated in FIG. 3. Note, TS* is examined when the processor is not the bus master to maintain internal state about bus mastership rights. All masters which can perform bus cycles on the bus must have their TS* signals bused/connected together in a preferred form.

FIG. 3 illustrates a clock generator circuit 16 which generates all the clock(s) for the elements of FIG. 3. Either one clock or a plurality of clocks may be used.

Arbitration within the system of FIG. 3 is based on current bus ownership and the concept that a bus cycle (Transfer start (TS*) -to- final transfer termination (TA* or TRA* or TEA*)) is an atomic entity which cannot be split, though it may be prematurely terminated. Note that "bus" as used herein collectively refers to one or more of the data bus, the address bus, and any control signals that can be assigned ownership. If the bus is currently owned by the primary master 10, it can be owned by another master (i.e., the alternate master) only after the completion of the final bus cycle when the primary master has asserted BTT* (or alternately, negated BB*).

If the bus is not currently owned by the primary master 10, the primary master 10 asserts its BR* signal as soon as it needs the bus. Bus mastership is assumed as soon as the assertion of BG* is received from the bus arbiter 14 and the one clock period assertion of the bused BTT* is detected (or alternately, the negation of BB* is detected at a rising clock edge), indicating the previous master (e.g. alternate master 12, although other masters may be within the system) has terminated its tenure and relinquished the bus. If the primary master 10 still has a need to use the bus when BG* is received, it assumes bus mastership, asserts TS* and starts a bus cycle. Note the primary master 10 negates its BR* signal, due to internal state, if the primary master 10 no longer needs to use the bus at that particular moment in time. The primary master 10 negates its BR* signal at the same time it asserts the TS* signal if the bus is only needed for one bus cycle. BR* is held for a longer period of time if more than one bus cycle is needed by the primary master 10.

The BTT* signal (or alternately BB*) is connected to all alternate masters in a system to advise of the termination of bus tenure by the primary master 10. The BTT* signal is asserted by the primary master 10 after it has lost right of ownership to the bus by the negation of BG* and is ready to end usage of the bus. After the final termination acknowledgment of the final bus cycle when the primary master 10 has lost bus ownership, the primary master 10 will assert BTT* for a one clock period, negate BTT* for a one clock period, and then tristate BTT* (see FIG. 2). If the external bus arbiter 14 has granted the bus to an alternate master (for example, alternate master 12) by the assertion of BG* to that alternate master, that alternate master, using the BTT* protocol, can start a bus cycle on the very next clock edge after the alternate master detects the assertion of BTT* from the primary master 10.

The previous master can be driving BTT* negated at the same time the current master is starting a bus cycle because the current master will still have its BTT* signal tristated (see FIG. 2). Since the alternate master does not drive BTT* in this protocol until it has finished its tenure, there is no conflict with tying all master's BTT* signals together (i.e., there is no contentions as indicated in FIG. 1 for the bus busy (BB*) protocol). The masters 10 and 12 in FIG. 3 alternately also provide the BB* arbitration protocol though the BB* arbitration protocol has slight timing differences than that illustrated in FIG. 1. The BB* protocol is provided to provide easy compatibility with older systems or processor that may not have the improved BTT* protocol.

When a processor using the BB* protocol is finished using the bus, BB* has to be driven negated for a period of time and then tristated. The use of the BTT* protocol, described above, works much better in a high speed bus environment than the BB* protocol because the method of driving (asserted, negated, or tristated) BTT* can be synchronous with the clock. Bus arbiters do not need to be changed when going from a BB* protocol system to a BTT* protocol system since bus arbiters do not need to sample the BB* signal in a BB* protocol system or BTT* in a BTT* protocol system, but need only use BR*, BG* and optionally LOCK* to determine bus ownership rights. Any masters need only sample BB* or BTT* and TS* to determine the proper times to take over ownership of the bus.

In cases where the primary master 10 has implicit bus ownership after it has finished all needed bus cycles, BTT* will remain tristated (or alternately BB* will remain asserted) until BG* is negated and the primary master 10 is forced off the bus. For this case, the very next clock period after the primary master detects the negation of BG* it asserts BTT* for one clock period (or alternately negates BB* for a single clock (CLK) period). In implicit bus ownership cases where the primary master 10 is given the bus but never actually uses it by asserting TS*, the primary master 10 will not assert BTT* (or alternately assert BB* and then negate BB*) when BG* is negated.

The transitions of BTT* must be tracked by masters, in the system that use the BTT* protocol, to determine the proper times at which the bus may be taken over. Transitions of BTT* prior to, during, and after the negation of BG* may also need to be logged by a master in cases where the bus grant (BG*) is not fixed with a master, and no master has used the bus for some time. In such cases, any master is required to have kept state information that indicated a previous master had earlier finished using the bus implying it is safe to immediately take control of the bus. The primary master 10 internally maintains this information in a preferred form.

After external reset, initiated with the negation of RSTI* (an external reset pin), and with BG* asserted, the primary master 10 will not wait for the assertion of BTT* by another master (i.e., the alternate master) to begin to take over mastership of the bus and start bus activity, provided there has been no assertion of TS* by another master in the interim of time between the negation of RSTI* and the clock cycle when the primary master 10 is ready to start a bus cycle. If another master (i.e., the alternate master) starts bus activity (TS* asserted) in this interim of time, even though the primary master 10 may have received a bus grant indication (BG* asserted), the primary master 10 will wait for BTT* to be asserted by the other master before it takes over bus mastership/ownership.

When BG* is negated by the arbiter 14, the primary master 10 relinquishes the bus as soon as the current bus cycle is complete unless a locked sequence of bus cycles is in progress with BGR* negated. In this case, the primary master 10 completes the sequence of atomic locked bus cycles, drives LOCK* negated for one clock period during the clock when the address and other bus cycle attributes are idled, and in the next clock period, tristates LOCK* and relinquishes the bus by asserting BTT* (see FIG. 6). The BGR* signal is a qualifier for BG* which indicates to the primary master 10 the degree of necessity for relinquishing bus ownership when BG* is negated. BGR* primarily affects how the primary master 10 will behave during atomic locked sequences when BG* is negated.

The primary master 10 of FIG. 3 has an arbitration protocol which allows bus ownership to be removed from the primary master 10 and granted to another bus master if it detects the negation of BG*, even if the processor is indicating a locked sequence of bus cycles. A LOCK* signal is provided by the primary master 10 to indicate the processor intends the current set of bus cycles to be locked together (i.e., not separable), but this can either be enforced or overridden by the system bus arbiter's control of the BGR* signal. The assertion of BGR* with the negation of BG* by an external bus arbiter 14 forces the processor to get off the bus as soon as the current bus cycle is finished even if the processor is running a locked sequence of atomic bus cycles. If both BGR* and BG* are negated when the primary master 10 is running a sequence of locked bus cycles, the primary master 10 finishes the entire set of atomic locked bus cycles and then relinquishes the bus at the completion of that unit of atomic locked bus cycles so no disruption of the atomic sequence occurs. This is referred to as terminating the bus ownership at a "convenient time" wherein a convenient time is any time chosen by the primary master such that any time lost by not relinquishing the bus immediately on deassertion of BG* is overcome by the advantage of letting the primary master finish a current task that the primary master is currently engaged in. Note that the primary master 10 may be running a set of back-to-back atomic locked bus cycles, the abutment of which an external bus arbiter 14 could not detect to determine a safe time at which to negate BG* (see FIG. 4). This is avoided when BGR* is negated. When BGR* is negated, the primary master 10 finishes the last bus cycle of the current set of atomic locked bus cycles and then relinquishes the bus, thus preventing the interruption of that unit of atomic locked bus cycles but releasing the bus before all back-to-back atomic locked bus cycles are performed. Therefore, bus availability is improved.

As an alternative to the BGR* protocol, the primary master 10 retains a LOCKE* signal for family compatibility. The primary master 10 is part of a family of processors which uses a LOCKE* signal during the last bus cycle of a locked sequence of bus cycles to allow an external arbiter to detect the boundary between back-to-back locked sequences on the bus. An external arbiter used with one processor in the family of processors can use the LOCKE* status signal to determine safe times to remove BG* without breaking a locked sequence and allow arbitration to be overlapped with the last transfer in a locked sequence. However, a retry acknowledge termination (TRA*) during the last bus cycle of a locked sequence with LOCKE* asserted and BG* negated requires asynchronous logic in the external bus arbiter to re-assert BG* before the bus cycle finishes to prevent the splitting or interruption of the locked sequence. Use of the BGR* protocol prevents this problem by letting the primary master 10 itself determine the proper time to relinquish bus ownership and simplifies the external bus arbiter design.

Locked sequences are usually required for instructions such as compare and swap (CAS) instructions, optionally for a move control (MOVEC) instruction, and test and set (TAS) instructions. For locked sequences of bus cycles, the primary master 10 asserts LOCK* along with the TS* of the first bus cycle and negates LOCK* following the final termination acknowledgment of the last transfer of the last bus cycle during the execution of the TAS and CAS instructions, on updates of history information in memory tablewalks, and after the execution of MOVEC instructions that set and later reset the LOCK bit in a Bus Control Register. Depending on how the arbiter 14 is designed with respect to LOCK* and BGR* using the LOCK* and LOCKE* signals can have the effect of preventing overlapped bus arbitration during locked sequences. By keeping LOCK* asserted throughout the duration of a locked sequence, the last bus cycle of the sequence can to be retried and still maintain the lock status.

The primary master 10, like other processors in the family of processors, will continue to retain and drive information from the last bus cycle on the address and attributes lines during times when the bus is still owned but idle after a previous usage. However, unlike the other processors in the family, in cases of implicit bus ownership, when the processor 10 has been granted the bus but has not yet run a cycle, the processor will not drive the address and attributes lines and they will remain tristated until a bus cycle is actually initiated.

The use of the BGR* signal solves the problem of an external bus arbiter not being able to determine a point at which bus ownership may be transferred to another master when the current master is performing a series of back-to-back locked transfer sequences in a synchronous bus system. The occurrence of a locked transfer will typically be denoted with a LOCK* signal which indicates that the current master intends the transfer or sequence of transfers to be atomic (i.e. non-separable). However, if the current master has several series of these atomic locked sequences back-to-back, and if an external arbiter could be aware of the abutments of these atomic sequences, it would be perfectly permissible for the external arbiter to take the bus ownership away from the master and give it to a more needy master at the interface between the sequences.

Figure 4:
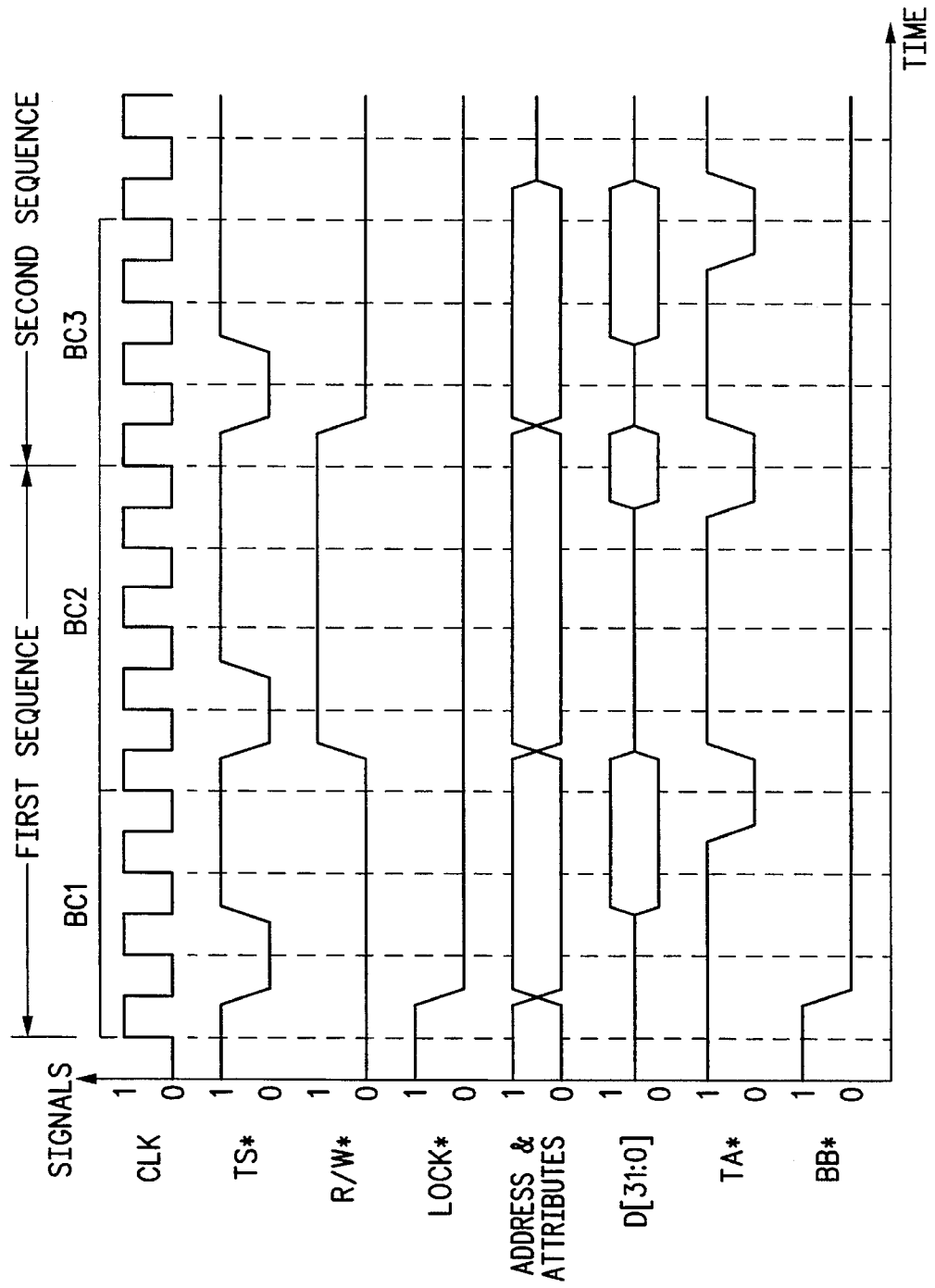
FIG. 4 illustrates, in a timing diagram, a known bus protocol wherein termination of ownership of the bus is difficult and a master may monopolize the bus.

The BGR* signal allows this added functionality. Therefore, the BGR* signal can be used to prevent starvation of the other bus masters during times when a current bus master is performing a long series of back-to-back locked transfers. FIG. 4 illustrates the operation of a known synchronous bus protocol performing two consecutive locked sequences with no intervening bus clocks. From FIG. 4 it can be seen that an external arbiter cannot determine the difference between a single locked sequence, many-transfer locked sequence, or multiple sequences that have no intervening bus clocks. This inability to determine the abutment of independent locked sequences is a problem when the arbiter needs to let another bus master have the bus, but needs to preserve the locked nature of the linked locked sequences without interruption.

To guarantee no disruption of the locked sequences the bus arbiter is forced to wait for the negation of LOCK* before negating BG* (bus grant) to the master currently using the bus. Since LOCK* is not negated between sequences, the current master can effectively monopolize the bus by running back-to-back locked sequences. Note the bus protocol of FIG. 4 requires LOCK* be asserted through the termination of the last transfer in a locked sequence. The LOCK* signal must remain asserted for all transfers within a locked sequence since a slave device may signal the need for a transfer retry on any bus transfer.

The above-discussed determination problem was also present in the preceding family of processors of the primary processor 10. Possible solutions considered for the preceding family processors were the addition of one or two dead clocks between locked sequences, but these were found to either end up also breaking a locked sequence or had the undesirable side-effect of lowering performance and increasing bus latency for other masters with urgent requests. To solve the determination problem prior processors had a last locked bus cycle status indicator (LOCKE* signal) added to their design to allow the arbiter to negate BG* to the master during the last transfer of a locked sequence and overlap arbitration with the transfer. However, there is a case during a bus cycle retry where the external bus arbiter must asynchronously reassert BG* to preserve the locked integrity of the bus transactions.

Figure 5:
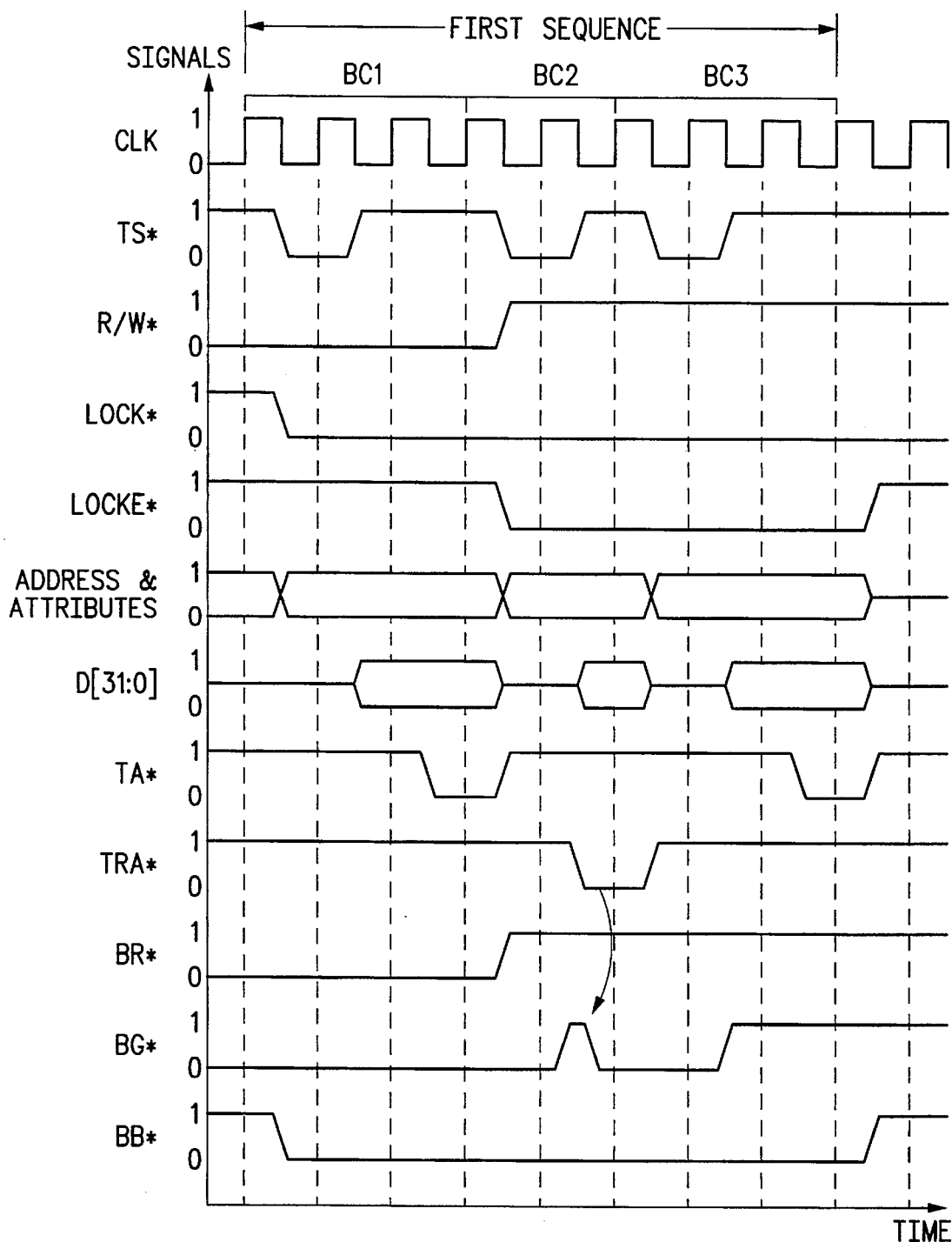
FIG. 5 illustrates, in a timing diagram, another known bus protocol wherein asynchronous Bus Grant (BG*) control is required in order to properly retry locked bus transfers.

FIG. 5 illustrates this case. Note in FIG. 5 that the bus arbiter negates BG* in bus cycle 2 (BC2) when it sees LOCKE* asserted and BR* (bus request) negated. However, a transfer retry is signaled (TRA* asserted) by a slave device. To prevent the breaking of a locked sequence the external bus arbiter must asynchronously reasserted BG*. This makes the design of an external bus arbiter which solves this problem very difficult since the transfer retry signal (TRA*) must also now be sampled. This is most likely impossible at very high frequencies.

Figure 6:
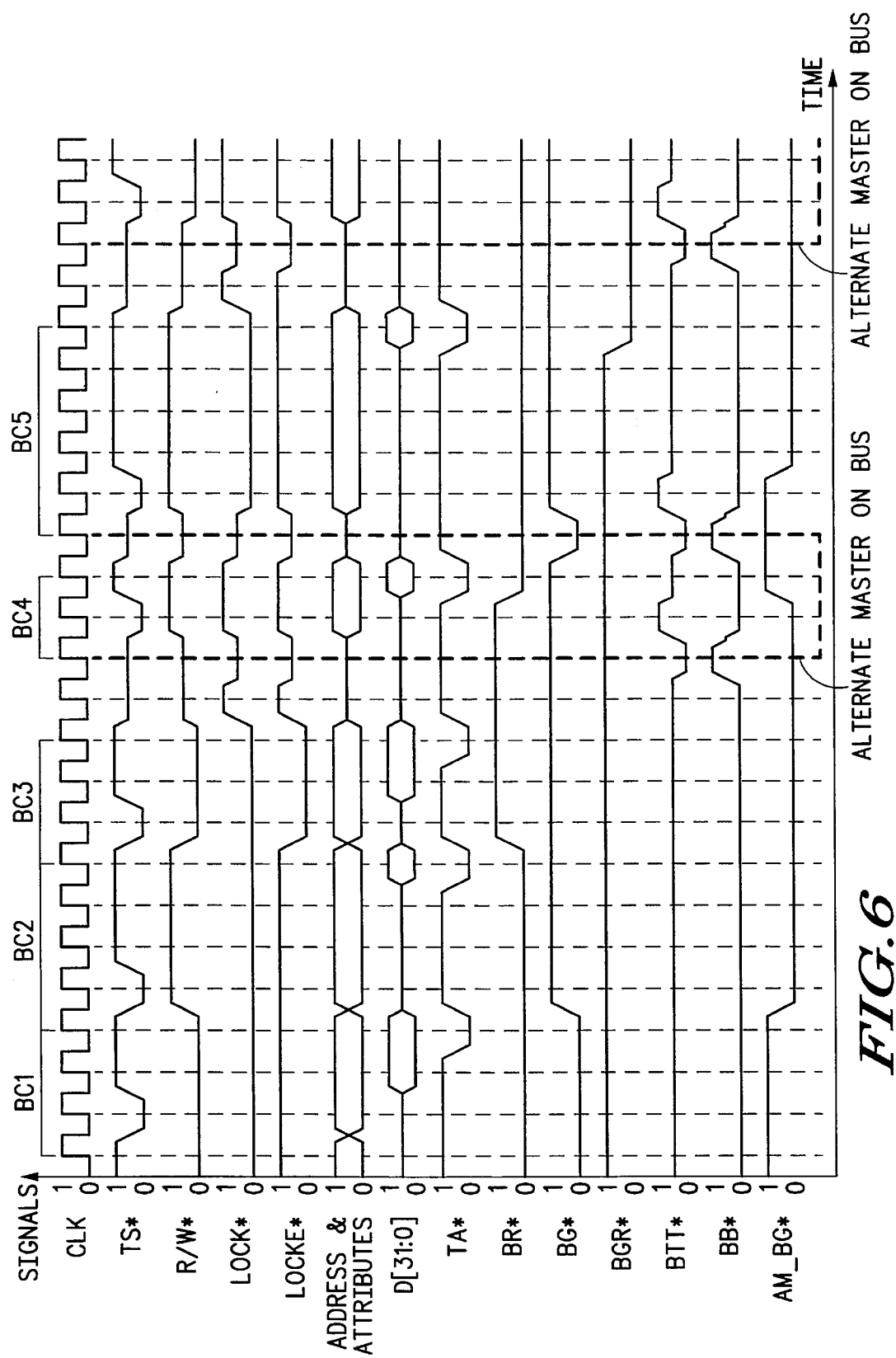
FIG. 6 illustrates, in a timing diagram, a bus protocol in accordance with the present invention.

The primary master 10 internally solves the problems described above by providing a bus grant relinquish (BGR*) input (with no need for a LOCKE* output) so that the primary master 10 can itself determine when it should give up the bus. In FIG. 6, the BGR* input notifies the primary master 10 of the degree of necessity of relinquishing the bus. If BGR* is asserted during or after the time when the external arbiter negates BG* (see bus cycle 5 (BC5)–FIG. 6), the primary master 10 will unconditionally relinquish the bus at the end of the current bus cycle even if the current cycle is part of a locked sequence of bus cycles. The lock is therefore broken due to the state of the BGR* signal. If BGR* is negated when the external bus arbiter negates BG* (see bus cycles 2&3 (BC2/BC3)–FIG. 6), the primary master 10 will wait until the successful completion of the entire locked sequence, thus guaranteeing the atomicity of the locked sequence and preventing the problems discussed above concerning transfer retry conditions (TRA*).

FIG. 6 illustrates the operation of the primary master 10 with respect to BGR*. The external arbiter 14 grants the bus to the alternate master, with BGR* negated to the primary master 10. Therefore, the primary master 10 finishes its series of locked bus cycles BC1, BC2, and BC3 (bus cycles 1, 2, and 3) before it relinquishes the bus. In bus cycle 5 (BC5) the primary master 10 is again running a sequence of locked bus cycles, but this time BGR* is asserted to the primary master 10 and BG* has been negated. Therefore, the primary master 10 immediately relinquishes the bus at the end of the current bus cycle, preempting the locked transfer sequence.

In general, the BGR* protocol totally solves the problem of asynchronous logic being required in an external bus arbiter. In addition, the BGR* protocol solves the problem of required asynchronous logic without the need for each master in a system to sample the state of two different bus grant inputs to determine bus ownership rights. The two-signal bus grant method (U.S. Pat. No. 5,127,089) has an unnecessary overhead of logic internal to a bus master and routing of another signal from the arbiter to each bus master in the system just to determine bus ownership rights and complicates the design of an external bus arbiter. In the BGR* protocol, individual bus grant signals (BG*) independently coupled to each bus master can be used to determine bus ownership, while the Bus Grant Relinquish (BGR*) signal qualifies the meaning and priority of the Bus Grant (BG*) signal when BG* negates. This protocol/method also yields a simpler external bus arbiter design.

In summary, the protocol taught herein provides a BGR* signal which indicates to a microprocessor the urgency of relinquishing ownership of the bus once BG* is negated. If BGR* is asserted when BG* is negated, then the bus controller/arbiter 14 is indicating to the primary master 10 that the primary master 10 must relinquish ownership of the bus as soon as possible, regardless of locked bus sequences. If BGR* is negated when BG* is negated to the primary master 10, then the primary master 10 determines the most appropriate time to relinquish the bus. Usually the most appropriate time is after the next bus transfer, if the bus cycle is not locked, or at the end of a complete locked transfer sequence.

The protocol taught herein also provides a BTT* signal which indicates to other masters that a master which last had ownership of the bus is terminating its bus ownership. BTT*, as described herein is superior to other protocols, such as the known BB* protocol. The BTT* signal is only asserted when the final bus cycle of a series/single transfer is complete unlike the continually asserted BB* signals which may result in bus data contention during bus arbitration.

While the present invention has been illustrated and described with reference to specific embodiments, further modifications and improvements will occur to those skilled in the art. For example, the control bits discussed herein may have other names but serve the same basic function. The size of buses, address buses, data buses, control signal buses, and other values may vary according to design. Any number of masters, N masters, may be connected to a bus arbiter 14 wherein N is a positive integer. In another form, the BGR* signal could be supplied as an output by another master in the system and not be an exclusive output of the bus arbiter 14. It is to be understood, therefore, that this invention is not limited to the particular forms illustrated and that it is intended in the appended claims to cover all modifications that do not depart from the spirit and scope of this invention.

What is claimed is:

1. A microprocessor implemented bus protocol method for controlling a bus transfer with a bus controller, the method comprising the steps of:

granting bus ownership to a master circuit by asserting a first control signal from a bus controller wherein the granting is conditioned only on the first control signal;

transferring data between the master circuit and a device external to the master circuit in response to the assertion of a second control signal which indicates that the bus transfer is to initiated;

sending a third control signal from the bus controller to the master circuit wherein the third control signal indicates to the master circuit whether the master circuit bus ownership should be relinquished at the termination of a current bus cycle when the first control signal is deasserted or should be terminated at the discretion of the master circuit when the first control signal is deasserted;

deasserting the first control signal to indicate to the master circuit that the bus ownership should be relinquished;

relinquishing the bus ownership at either the termination of the current bus cycle or at the discretion of the master circuit as determined by the third control signal; and communicating external to the master circuit that the master circuit has terminated its bus ownership by asserting a fourth control signal wherein the fourth control signal is asserted by the master circuit, the fourth control signal being asserted at a time which is determined by the state of the third control signal and the first control signal, the fourth control signal being tri-stated during bus ownership by the master circuit, being tri-stated during lack of bus ownership by the master circuit, and only being asserted when bus ownership is being transitioned between a granted state and an ungranted state with respect to the master circuit.

2. The bus protocol method of claim 1 wherein the step of communicating external to the master circuit that the master circuit has terminated its bus ownership by asserting the fourth control signal comprises the steps of:

driving the fourth control signal to a logic zero value for only a single first clock cycle of the master circuit; and driving the fourth control signal to a logic one value for only a single second clock cycle wherein the second clock cycle directly follows the first clock cycle in time.

3. The bus protocol method of claim 1 wherein the step of communicating external to the master circuit that the master circuit has terminated its bus ownership by asserting the fourth control signal comprises the steps of:

driving the fourth control signal to a first logic value from a tri-state value wherein the first logic value is maintained only for one clock cycle;

driving the fourth control signal to a second logic value from the first logic value wherein the second logic value is different from the first logic value and the second logic value being maintained for only one clock cycle; and driving the second logic value to the tri-state value.

4. The bus protocol method of claim 1 wherein the step of sending the third control signal to the master circuit comprises:

indicating to the master circuit that a locked sequence of bus transfers must be prematurely terminated due to a logic state of the third control signal.

5. A data processing system having a bus protocol for allowing a first circuit to interface to a second circuit through a bus, the data processing system comprising:

circuitry for providing a first control signal as an output from the first circuit to indicate that ownership of the bus is requested;

circuitry for receiving a second control signal as an input to the first circuit which is used to indicate whether the first circuit is granted ownership of the bus; and circuitry for providing a third control signal as an output from the first circuit wherein the third control signal is asserted only when the first circuit is ready to relinquish ownership of the bus, the third control signal being tri-stated during a first time period when the first circuit has control of the bus, being tri-stated during a second time period when the first circuit lacks control of the bus and being asserted to both a high voltage and a low voltage in a time sequential and mutually exclusive manner in two clock cycle time period when transitioning in time from the first time period to the second time period.

6. The data processing system of claim 5 wherein the third control signal is provided as an input/output signal wherein the third control signal can be driven by the first circuit in a first time interval and read by the first circuit in a second time interval.

7. The data processing system of claim 6 wherein the third control signal is read by the first circuit in order to determine when the bus is available for use.

8. The data processing system of claim 5 further comprising:

means for providing a fourth control signal as an output of the first circuit wherein the fourth control signal indicates, external to the first circuit, the start of a bus cycle.

9. The data processing system of claim 8 further comprising:

means for recording past assertions of the fourth control signal and the third control signal in order to determine when in time the bus is available for ownership use.

10. The data processing system of claim 5 wherein a bus arbiter circuit determines whether the first circuit within the system is given mastership of the bus.

11. A microprocessor implemented bus protocol for allowing a first circuit to interface to a second circuit through a bus, the bus protocol comprising:

means for providing a first control signal as an output from the first circuit to indicate that ownership of the bus is requested;

means for receiving a second control signal as an input to the first circuit which is used to indicate whether the first circuit is granted ownership of the bus; and means for receiving a third control signal as an input to the first circuit wherein the third control signal is set to a first logic state to indicate that the first circuit must relinquish bus ownership in response to deassertion of the first control signal at the end of a current bus cycle being performed by the first circuit when the deassertion of the first control signal occurs and wherein the third control signal is set to a second logic state to indicate that the first circuit is to relinquish bus ownership in response to deassertion of the first control signal at a convenient time determined by the first circuit when the deassertion of the first control signal occurs.

12. The bus protocol of claim 11 further comprising:

means for providing a fourth control signal as an output of the first circuit wherein the fourth control signal indicates, external to the first circuit, the start of a bus cycle.

13. The bus protocol of claim 12 further comprising:

means for keeping track of past assertions of the fourth control signal in order to determine when in time the bus is available for ownership use.

14. The method of claim 11 wherein a bus arbiter circuit, coupled to the first circuit, generates the second control signal.

15. The bus protocol of claim 11 wherein the third control signal to the master circuit is used to indicate to the master circuit that a locked sequence of bus transfers must be prematurely terminated due to the state of the third control signal.

16. The bus protocol of claim 11 wherein the assertion of the third control signal indicates to the first circuit that the first circuit must relinquish bus ownership at the end of a current bus cycle being performed by the first circuit and deassertion of the third control signal indicates to the first circuit that the first circuit is to relinquish bus ownership at a convenient time after deassertion of the second control signal, the convenient time being determined by the first circuit.

17. A microprocessor implemented bus protocol for allowing a first circuit to interface to a second circuit through a bus, the bus protocol comprising:

means for providing a first control signal as an output from the first circuit to indicate that ownership of the bus is requested;

means for receiving a second control signal as an input to the first circuit which is used to indicate whether the first circuit is granted ownership of the bus;

means for receiving a third control signal as an input to the first circuit wherein the third control signal is set to a first logic state to indicate that the first circuit must relinquish bus ownership at the end of a current bus cycle being performed by the first circuit and wherein the third control signal is set to a second logic state to indicate that the first circuit is to relinquish bus ownership at a convenient time determined by the first circuit; and means for providing a fourth control signal as an output from the first circuit wherein the fourth control signal is asserted only when the first circuit is ready to relinquish ownership of the bus, the fourth control signal being tri-stated during a first time period when the first circuit has control of the bus, being tri-stated during a second time period when the first circuit lacks control of the bus, and being asserted to both a high voltage and a low voltage in a time sequential and mutually exclusive manner in a two clock cycle time period when transitioning in time from the first time period to the second time period.

18. The bus protocol of claim 17 wherein the fourth control signal is provided as an input/output signal wherein the fourth control signal can be driven by the first circuit in a first time interval and read by the first circuit in a second time interval.

19. The bus protocol of claim 18 wherein the fourth control signal is read by the first circuit in order to determine when the bus is available for use.

20. The bus protocol of claim 17 further comprising:

means for providing a fifth control signal as an output of the first circuit wherein the fifth control signal indicates, external to the first circuit, the start of a bus cycle.

21. The bus protocol of claim 20 further comprising:

means for keeping track of past assertions of the fifth control signal and the fourth control signal in order to determine when in time the bus is available for ownership use.

22. The bus protocol of claim 17 wherein a bus arbiter circuit, coupled to the first circuit, generates the second control signal.

23. The bus protocol of claim 17 wherein third control signal to the master circuit is used to indicate to the master circuit that a locked sequence of bus transfers must be prematurely terminated due to the state of the third control signal.

24. The bus protocol of claim 17 wherein the assertion of the third control signal indicates to the first circuit that the first circuit must relinquish bus ownership at the end of a current bus cycle being performed by the first circuit and deassertion of the third control signal indicates to the first circuit that the first circuit is to relinquish bus ownership at a convenient time after deassertion of the second control signal, the convenient time being determined by the first circuit.

25. A microprocessor implemented bus protocol method for allowing a first circuit to interface to a second circuit through a bus, the bus protocol method comprising the steps of:

providing a first control signal out from the first circuit to indicate that the first circuit is requesting ownership of the bus;

providing a second control signal into the first circuit which is used to indicate whether the first circuit is granted ownership of the bus; and providing a third control signal into the first circuit wherein the third control signal is set to a first logic state to indicate that the first circuit must relinquish bus ownership at the end of a current bus cycle being performed by the first circuit and wherein the third control signal is set to a second logic state to indicate that the first circuit is to relinquish bus ownership at any time which is subsequent to deassertion of the second control signal, said time being a convenient time determined by the first circuit, the first control signal only performing bus granting functions where the first control signal is not used to communicate information identical to the third control signal.

* * * * *